US005477287A

United States Patent [19]
Campbell

[11] Patent Number: 5,477,287
[45] Date of Patent: Dec. 19, 1995

[54] ADJUSTABLE LIGHT SUPPORT ARM

[75] Inventor: Allan T. Campbell, Santa Barbara, Calif.

[73] Assignee: Technical Lighting Control, Inc., Santa Barbara, Calif.

[21] Appl. No.: 311,133

[22] Filed: Sep. 22, 1994

[51] Int. Cl.6 .......................... G03B 17/08; G03B 29/00; G03B 17/00
[52] U.S. Cl. ................... 354/64; 354/81; 354/293
[58] Field of Search ...................... 354/64, 81, 82, 354/293; 248/160, 276

[56] References Cited

U.S. PATENT DOCUMENTS 4,727,390  2/1988  Braun ........................... 354/82
4,916,471  4/1990  Tussey .......................... 354/64
5,027,139  6/1991  Varouxis et al. ................ 354/64
5,142,299  8/1992  Braun ........................... 354/64

Primary Examiner—M. L. Gellner
Assistant Examiner—Eddie C. Lee
Attorney, Agent, or Firm—Marvin E. Jacobs

[57] ABSTRACT

A strobe light mounting system for underwater cameras with arm segments clamped together with side clamps that grasp balls on the ends of the arm segments. The arm segments are rigid, light, and low in water resistance because they have four longitudinal channels pierced by mutually orthogonal transverse holes of large diameter so that longitudinal ribs are preserved at the maximum diameter of the arm segment. Water flows easily through the orthogonal holes permitting easy movement underwater.

12 Claims, 1 Drawing Sheet

ADJUSTABLE LIGHT SUPPORT ARM

TECHNICAL FIELD

This invention concerns articulated support arms to mount lights and other accessories to cameras, especially where the cameras are used for underwater applications.

BACKGROUND OF THE INVENTION

Underwater photography usually requires artificial lighting to overcome the low level of available natural light. The fluid environment makes fixed light support tripods and the like not a practical solution. Hence, the industry has developed various types of adjustable light support arms that extend out from the camera and locate lights, usually called strobes in the camera arts, at fixed desired positions relative to the camera. These so called strobe arms must be strong, rigid, and light weight. At the same time, they must be easily adjustable to different positions by a diver working underwater in difficult conditions. Still further, the strobe arms can not be too bulky or they will be very hard to move through the water. All of these conflicting requirements have not been well met by the simple aluminum tube arms generally utilized in the prior art. The present invention offers a much improved design.

STATEMENT OF THE INVENTION

Briefly, this invention relates to a strobe arm comprising a plurality of arm segments that connect to each other with easily adjustable clamps so that the assembly of connected segments can assume any desired position. The arm segments are formed from a solid cylindrical aluminum rod that has four grooves or channels along the length of the rod so as to reshape the rod into an almost square, easy to grip, segment. The channels are sized to leave four strips of the cylindrical rod in place at the maximum rod diameter so that the rigidity of the segment is preserved.

Opposite channels are connected by transverse, orthogonally intersecting holes of diameter about one half the diameter of the cylindrical rod. Two synergistic advantages arise from the transverse orthogonal holes. First, a large amount of material is removed from inside the rod where the material does not contribute much to the strength of the rod. Thus, the arm segment is made much lighter but still remains very rigid. Second, because the orthogonal holes are relatively large, and intersect each other, water is allowed to flow not only through the holes, but also in one hole and out the other. Therefore, the arm segments are easy to move through the water as water flows with minimal resistance around and through the arm. Hence, the assembled strobe arm has low mass, high rigidity, and very low water resistance. Numerous other benefits and advantages will become apparent from the following detailed description and the drawings referenced thereby.

DETAILED DESCRIPTION OF THE INVENTION

Figure 1:
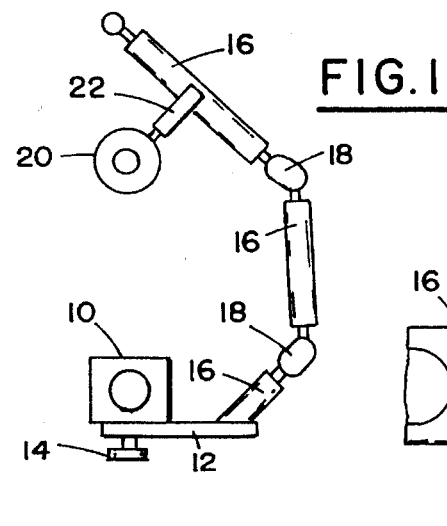
FIG. 1 is a schematic diagram of the present inventive strobe arm typically mounted to a camera, showing several arm segments connected together by clamps.

In FIG. 1, a camera 10 is schematically shown. An accessory support member 12, generally called a tray in the art, is fastened to the bottom of camera 10 with a screw 14 using a standard mounting position. For descriptive purposes, three arm segments 16 are shown in FIG. 1, clamped to each other in a desired configuration by side clamps 18. The lower arm segment 16 is connected to tray 12 by any suitable means and is not described here. A strobe light 20 is mounted on the upper arm segment 16 with a saddle clamp 22 which is described later with respect to FIG. 8. Side clamps 18 are depicted in FIG. 2.

Figure 2:
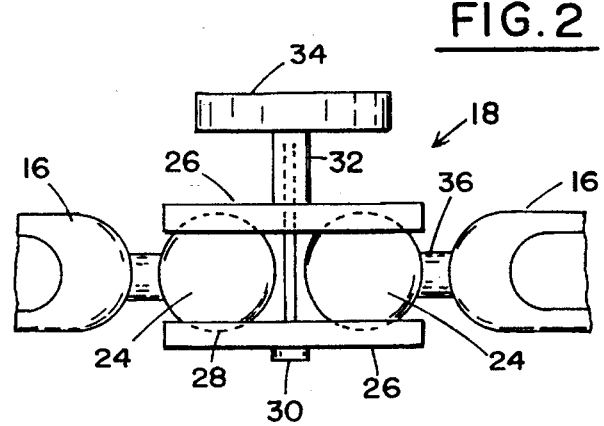
FIG. 2 is an enlarged fragmentary view of the clamp that holds the arm segments in various positions relative to each other.

FIG. 2 shows that the arm segments 16 are provided with spherical ball ends 24. Side clamp 18 has a pair of clamping plates 26. Each plate 26 has two spherical indentations 28 therein, sized to accept balls 24 in intimate and extensive contact. Indentations 28, if desired, may comprise holes that extend through plates 28 with beveled edges to engage balls 24. A threaded bolt 30 passes through both plates 28 and into the deeply threaded hub 32 of an adjustment knob 34. Since the hub 32 is threaded, a large number of threads are available to engage bolt 30, thus, allowing a wide range in adjustment of the pressure of plates 26 on balls 24. With knob 34 slightly loosened, each segment 16 can be angled through an arc of nearly 270 degrees, because of the narrow necks 36, and also rotated about its own axis, so that virtually any relative position may be achieved. The knob 34 is then retightened to lock the segments in place.

Figure 3:
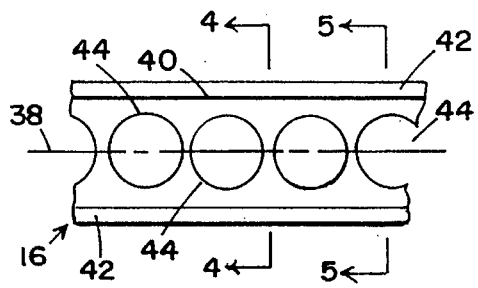
FIG. 3 is an elevational side, or top, view of a short portion of an arm segment showing the channels and holes therethrough.
Figures 4, 5:
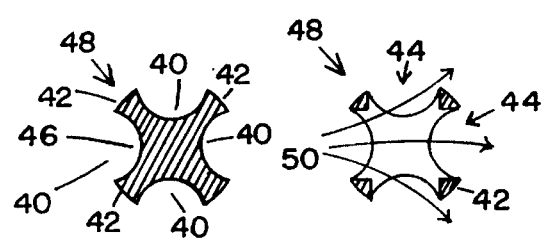
FIGS. 4 and 5 are cross sectional views of the segment portion of FIG. 3, taken on lines 4—4 and 5—5 respectively.

Referring simultaneously to FIGS. 3–5, it may be seen that arm segments 16 comprise cylindrical rods with a central longitudinal axis 38, and four longitudinal channels 40 formed along the sides of the segment. Channels 40 are sized to leave four strips or ribs of material 42 at the maximum diameter of segment 16 so as to maintain the strength and rigidity of arm segment 16. This configuration also gives segment 16 a generally square cross section that is easy to grip in an underwater environment. Channels 40 and ribs 42 are easiest to visualize in the cross sectional view of FIG. 4.

Returning to FIG. 3, a series of transverse holes 44 are visible that extend from one channel 40 through to the opposite channel 40. There is also a series of orthogonal transverse holes that intersect holes 44. If segment 16 is rotated 90 degrees about its central axis 38 in FIG. 3, it would appear exactly the same as FIG. 3, except that the orthogonal holes 44 would now be visible.

Figure 6:
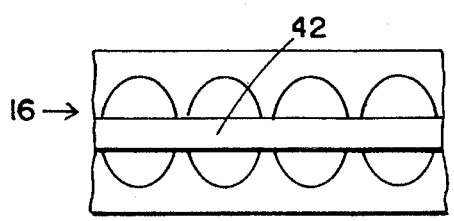
FIG. 6 is identical to FIG. 3, but with the portion rotated 45 degrees about its horizontal central axis, to better show the easy water flow paths through the arm segment.
Figure 7:
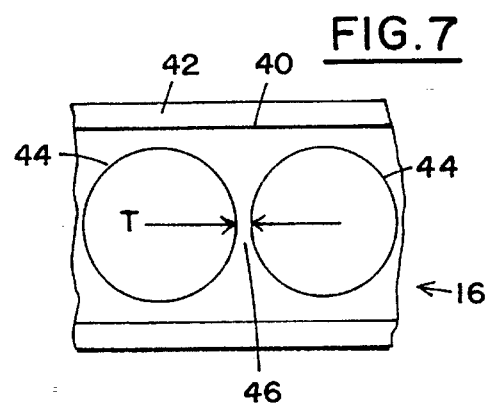
FIG. 7 shows an enlarged fragment of the FIG. 3 arm.

The diameter of holes 44 should be as large as possible without cutting through ribs 42. As can be seen in the sectional view of FIG. 5, the diameter of holes 44 are about 40 to 50 percent the diameter of segment 16. The separation of holes 44 along the longitudinal axis is also kept to a minimum without eliminating the wall of material 46 that spaces ribs, as most easily seen in FIGS. 4 and 7. As shown in FIG. 7, the thickness T of wall 46 is less than half the diameter of holes 44, preferably, about or even less than 15 percent of the diameter of holes 44. With the holes 44 this proximate to each other, water can easily flow not only through the individual holes, but also in one hole and easily out the orthogonal intersecting hole as illustrated by the arrows 50 in FIG. 5. Thus, underwater movement of the camera and strobe arms is much easier because water resistance is very much lower as the water flows with minimum turbulence and direction change. FIG. 6 further demonstrates the transparency of the arm segments to water flow. In FIG. 6, the portion of segment 16 shown in FIG. 3 is shown rotated 45 degrees about longitudinal axis 38. This view direction is that indicated by arrows 48 in FIGS. 4 and 5. As can be seen in FIGS. 4–6, water can flow through the openings in numerous ways so as to minimize resistance. However, the segment 16 remains very rigid due to the preservation of longitudinal ribs 42 transversely located by walls 46.

Figure 8:
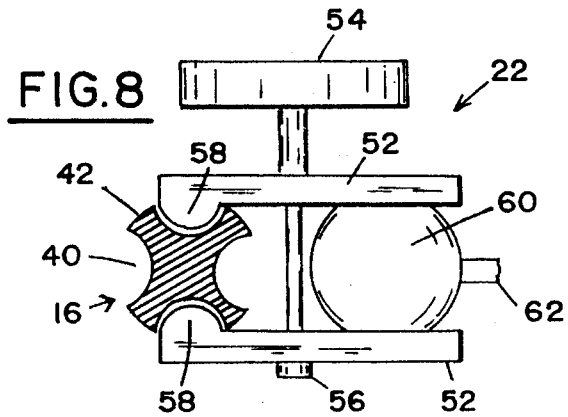
FIG. 8 shows a clamp to fasten lights and accessories directly to the arms.

Strobe lights and other accessories may be attached to the articulated collection of arm segments with a segment that is designed to connect to the accessory, as necessary, and also designed with a ball end 26, so that side clamps 18 may be employed to locate it. Alternatively, FIG. 8 shows a saddle clamp 22 that is similar to side clamp 18 with clamping plates 52, a knob 54, and a bolt 56. However, plates 52 have projections 58 that rest in channels 40. With this arrangement, the saddle clamp 22 can be slid along the length of segment 16 to any desired position, and locked in place by tightening knob 54 on bolt 56. Plates 53 then clamp a ball end 60 which is connected by a neck 62 to the desired accessory mount. Saddle clamp 22 also allows a new branch of connected arm segments to be started. It is evident that any collection of strobes and accessories, in any position, may be quickly and easily assembled from the novel segments and clamps of the present invention. The resulting collection is light, rigid, and low in water resistance. We intend to be limited not to the specific arrangements shown in the drawings, but only by the appended claims and their equivalents.

We claim:

1. An adjustable light support system adapted to be fastened to a camera, and adapted for use in an underwater environment comprising in combination:
   a plurality of arm segments, each of said arm segments having four longitudinal channels formed along the length of the arm segment and a series of orthogonal intersecting holes extending transverse to the length of the arm segment from one channel to another channel, the distance along the length of the arm segment and between the holes being less than fifty percent of the diameter of the transverse holes, so as to permit easy water flow through the holes;
   a plurality of side clamps adapted to clamp together a pair of arm segments;
   a tray adapted to be fastened to a camera;
   an arm segment adapted to connect to said tray; and
   light support means adapted to connect to an arm segment.

2. The system of claim 1 in which said distance between the holes is approximately fifteen percent of the diameter of the holes.

3. The system of claim 1 in which said arm segments are generally cylindrical so as to have a diameter measured perpendicular to said length of the arm segment, and said channels are sized to preserve ribs along the length of the arm, said ribs having a width measured perpendicular to the length of the arm segment the same as said diameter of the arm segments.

4. The system of claim 3 in which said distance between the holes is about fifteen percent of the diameter of the holes.

5. The system of claim 3 in which said side clamps comprise clamping plates adapted to compress ball shaped ends of the arm segments therebetween, and a bolt through the clamping plates that is threaded into a tightening knob so as to compress said clamping plates.

6. The system of claim 4 in which said side clamps comprise clamping plates adapted to compress ball shaped ends of the arm segments therebetween, and a bolt through the clamping plates that is threaded into a tightening knob so as to compress said clamping plates.

7. The system of claim 3 including saddle clamping means having saddle clamping plates adapted to compress an arm segment therebetween, said saddle clamping plates having projections thereon located to rest in said channels in said arm segments, said saddle clamping means adapted to connect to a desired attachment.

8. The system of claim 6 including saddle clamping means having saddle clamping plates adapted to compress an arm segment therebetween, said saddle clamping plates having projections thereon located to rest in said channels in said arm segments, said saddle clamping means adapted to connect to a desired attachment.

9. An arm segment for use in an underwater environment having four longitudinal channels formed along the length of the arm segment and a series of orthogonal intersecting holes extending transverse to the length of the arm segment from one channel to another channel, the distance along the length of the arm segment and between the holes being less than fifty percent of the diameter of the transverse holes, so as to permit easy water flow through the holes.

10. The arm segment of claim 9 in which said distance between the holes is approximately fifteen percent of the diameter of the holes.

11. The arm segment of claim 10 in which said arm segment is generally cylindrical so as to have a diameter measured perpendicular to said length of the arm segment, and said channels are sized to preserve ribs along the length of the arm, said ribs having a width measured perpendicular to the length of the arm segment the same as said diameter of the arm segment.

12. The arm segment of claim 11 in which said distance between the holes is about fifteen percent of the diameter of the holes.

* * * * *